United States Patent
Morrison et al.

(10) Patent No.: US 9,983,620 B1
(45) Date of Patent: May 29, 2018

(54) DETACHABLE COVER FOR A COMPUTING DEVICE

(71) Applicant: Dell Products L.P., Round Rock, TX (US)

(72) Inventors: John Trevor Morrison, Round Rock, TX (US); Christopher A. Torres, San Marcos, TX (US)

(73) Assignee: Dell Products L.P., Round Rock, TX (US)

(*) Notice: Subject to any disclaimer, the term of this patent is extended or adjusted under 35 U.S.C. 154(b) by 0 days. days.

(21) Appl. No.: 15/444,639

(22) Filed: Feb. 28, 2017

(51) Int. Cl.
*G06F 1/16* (2006.01)
*F16B 2/18* (2006.01)

(52) U.S. Cl.
CPC .............. *G06F 1/1618* (2013.01); *F16B 2/18* (2013.01); *G06F 1/162* (2013.01); *G06F 1/1647* (2013.01); *G06F 1/1679* (2013.01); *G06F 1/1681* (2013.01)

(58) Field of Classification Search
CPC ...... G06F 1/1618; G06F 1/1647; G06F 1/162; G06F 1/1681; G06F 1/1679; F16B 2/18
See application file for complete search history.

(56) References Cited

U.S. PATENT DOCUMENTS

| | | | | |
|---|---|---|---|---|
| 5,403,109 A * | 4/1995 | Johnson | ............. | F16B 12/2036 403/231 |
| 5,682,993 A * | 11/1997 | Song | ........................ | A45F 3/02 206/320 |
| 5,835,344 A * | 11/1998 | Alexander | ............ | G06F 1/1628 206/320 |
| 6,109,434 A * | 8/2000 | Howard, Jr. | .......... | G06F 1/1601 206/320 |
| 7,643,274 B2 * | 1/2010 | Bekele | .................. | G06F 1/1616 206/320 |
| 7,775,355 B1 * | 8/2010 | Hood | ...................... | G06F 1/181 206/320 |
| 8,730,667 B2 * | 5/2014 | Kaneko | .................. | A45C 11/00 206/320 |
| 8,794,864 B2 * | 8/2014 | Vallance | ............. | F16B 12/2036 403/350 |
| D725,796 S * | 3/2015 | Van Camp | .................... | D25/119 |
| 2005/0042027 A1 * | 2/2005 | Migli | .................. | F16B 12/2009 403/409.1 |
| 2008/0308437 A1 * | 12/2008 | Lin | ...................... | G06F 1/1616 206/320 |

(Continued)

*Primary Examiner* — Dimary Lopez Cruz
*Assistant Examiner* — Abhishek Rathod
(74) *Attorney, Agent, or Firm* — Campbell Stephenson LLP; Shiv S. Naimpally

(57) ABSTRACT

In some implementations, a cover may be attached to or detached from a computing device. For example, individual cam locks of a plurality of cam locks embedded into a computing device may be placed in an open position. Individual pins of a plurality of pins fastened to the cover may be aligned with a corresponding cam lock of the plurality of cam locks. The individual pins may be inserted into the corresponding cam locks. The individual cam locks may be moved from the open position to a closed position, causing the cover to be attached to the external surface of the computing device. The cover may include a curved portion that causes the cover to apply pressure to the outer surface of the computing device when the plurality of cam locks are in the closed position.

20 Claims, 12 Drawing Sheets

(56) References Cited

U.S. PATENT DOCUMENTS

| | | | | |
|---|---|---|---|---|
| 2015/0192953 A1* | 7/2015 | Meyers | ................... | B29C 70/42 455/575.8 |
| 2016/0139635 A1* | 5/2016 | Gibson | ................. | G06F 1/1654 361/679.55 |

* cited by examiner

1200

```
PLACE CAM LOCKS THAT ARE EMBEDDED INTO A COMPUTING DEVICE TO AN OPEN
POSITION
1202
           ↓
ALIGN PINS IN A COVER WITH CORRESPONDING CAM LOCKS
1204
           ↓
INSERT THE PINS INTO THE CORRESPONDING CAM LOCKS
1206
           ↓
MOVE THE CAM LOCKS FROM THE OPEN POSITION TO A CLOSED POSITION
(E.G., THEREBY ATTACHING THE COVER TO THE COMPUTING DEVICE)
1208
           ↓
MOVE THE CAM LOCKS FROM THE CLOSED POSITION TO THE OPEN POSITION
1210
           ↓
DETACH THE COVER (E.G., CAUSING THE PINS TO BE REMOVED FROM THE
CORRESPONDING CAM LOCKS)
1212
```

FIG. 12

DETACHABLE COVER FOR A COMPUTING DEVICE

BACKGROUND OF THE INVENTION

Field of the Invention

This invention relates generally to computing devices and, more particularly, to a detachable cover for a computing device (e.g., an information handling system).

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A computing device, such as a tablet, may include a single display device or multiple (e.g., two or more) display devices. For example, a first housing that includes a first display device may be coupled by one or more hinges to a second housing that includes a second display device. The hinges may enable the first display device to be positioned at an angle between about 0 degrees to about 360 degrees relative to the second display device.

Enabling a user to attach a cover to and detach the cover from a computing device may enable the user to customize the appearance of the computing device according to the user's interests. For example, the user may attach a cover with the name and/or logo of a particular sports team to which the user has an allegiance. As another example, the user may coordinate the appearance of the computing device with the user's appearance by attaching a cover that includes one (or more) colors that closely match one (or more) colors in an article of clothing that the user is wearing. As yet another example, if the cover becomes damaged, the user may remove (e.g., detach) the cover and attach a new cover. By enabling the user to attach and detach covers to the computing device, the user can easily modify the appearance of the computing device by detaching a first cover and attaching a second cover according to the user's desire.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some implementations, a cover may be attached to or detached from a computing device. For example, individual cam locks of a plurality of cam locks embedded into a computing device may be placed in an open position. Individual pins of a plurality of pins fastened to the cover may be aligned with a corresponding cam lock of the plurality of cam locks. The individual pins may be inserted into the corresponding cam locks. The individual cam locks may be moved from the open position to a closed position, causing the cover to be attached to the external surface of the computing device. The cover may include a curved portion that causes the cover to apply pressure to the outer surface of the computing device when the plurality of cam locks are in the closed position.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

FIG. 12 is a flowchart of a process that includes attaching and detaching a cover according to some embodiments.

DETAILED DESCRIPTION

Figure 1:
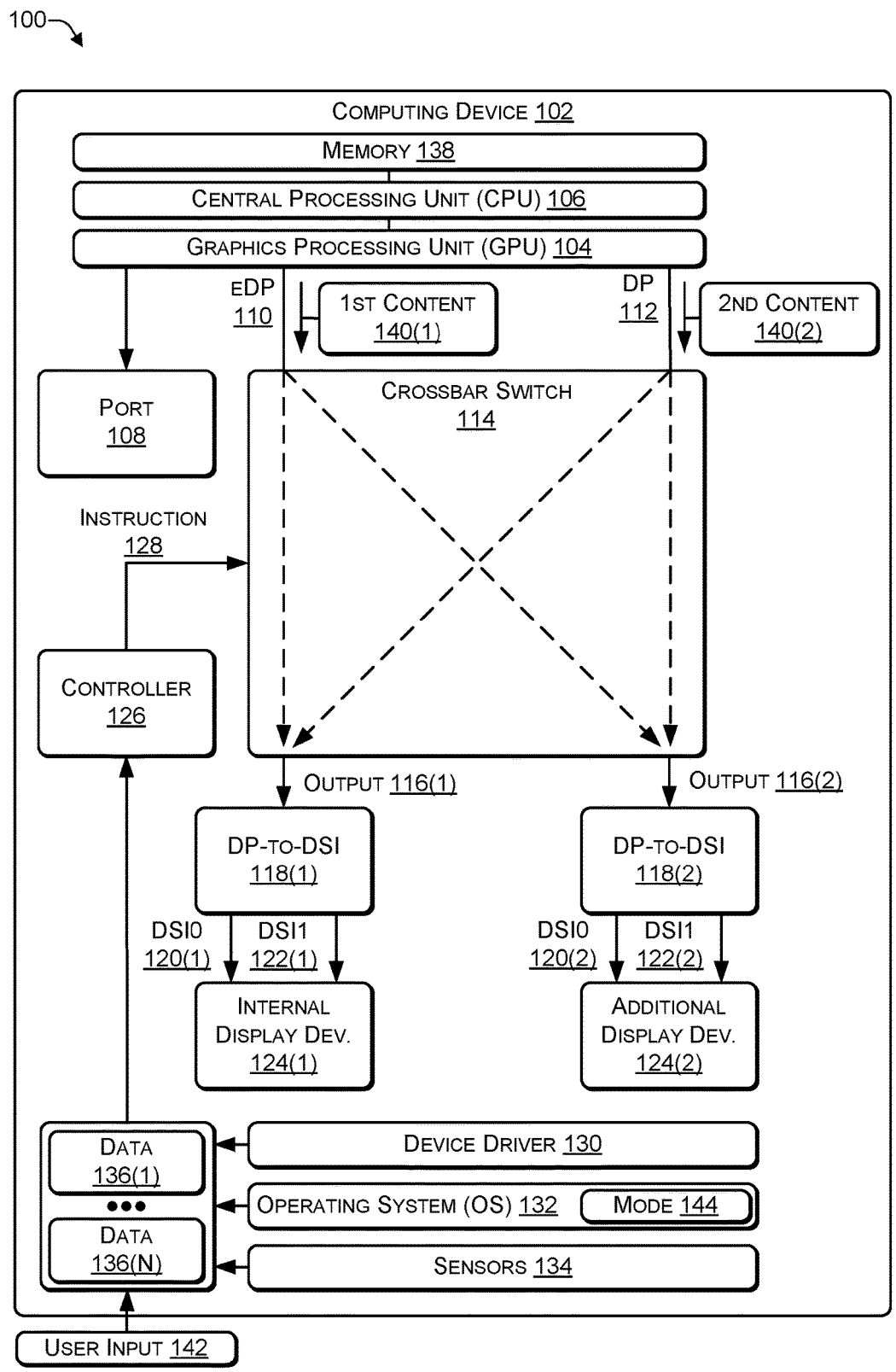
FIG. 1 is a block diagram of an architecture of a computing device that includes a crossbar switch according to some embodiments.

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

In some cases, an IHS may be implemented in the form of a computing device with one or more display devices. When implemented using more than one display device, each display device may be attached to a neighboring display device using one or more hinges that enable each display device to be placed at an angle (e.g., between 0 and 360) relative to the neighboring display device.

A detachable cover may be used to protect the external surface of the computing device, change an appearance of the external surface of the tablet computing device, or both. The cover may include one or more layers of materials, such as plastic (e.g., vinyl, synthetic leather, etc.), metal, cloth, and the like. Prior to attachment, the detachable cover may include a curve (e.g., the cover may be convex-shaped) to create a preload on the computing device after the cover is attached. The preload may be designed to cause the cover to exert a particular amount of pressure (e.g., structural tension) on the computing device, thereby preventing a gap from occurring between the cover and the computing device. The preload may thus prevent dirt or other particles from entering a gap between the cover and the computing device. In addition, the preload may provide electrical connections, thermal transfer, and structural tensioning. For example, a metal layer in the cover may be used to provide a ground or other type of electrical connection. As another example, a layer (e.g., graphene layer) of the cover may be used to distribute thermal energy from a first housing (e.g., that houses heat-generating components) to a second housing (e.g., that houses heat dissipating components).

The mechanism used to attach and detach the cover may be concealed and/or integrated into the design of the computing device while still enabling the user to easily attach, remove, and replace the cover. The cover is designed to avoid interfering with cable routing, antenna placement, speakers, thermal characteristics, and other internal components. The attachment mechanism may withstand hundreds of covers being attached and detached over the life of the computing device. The cover may flex to accommodate multiple housings (e.g., multiple display devices). For example, the cover may flex to enable each housing to be placed at an angle relative to a neighboring housing.

A first type of mechanism to attach and detach a cover may include an internal latching mechanism integrated around the perimeter of the computing device's main housing. One or more detachment latches may be located on the exterior of the computing device to enable the end user to easily attach and detach the cover. The latch may be concealed (e.g., integrated into the design) in a way that reduces or prevents accidental actuation of the mechanism while still being obvious/intuitive for the end user. For example, the cover may include multiple pins with each pin including a pinhead. The latching mechanism may include multiple cam locks with at least two positions, e.g., an unlocked position in which a cover can be attached or detached and a locked position that temporarily and securely fastens the cover to the computing device. The cam locks may enable the user to perform a gross alignment of the pinheads with the cam locks during attachment (e.g. when the cam locks are in the open position). The cam locks may automatically further align and load the cover when the latches (e.g., the cam locks) are moved to the closed position. The cover may be designed with a convex shape when the cover is not attached to create a preload on the computing device when the latches (e.g., cam locks) are in the locked position. To attach the cover, the user may place the cam locks in the open position, align the cover and the computing device such that the pins in the cover are aligned with openings in the cam locks, and place the cam locks in the closed position. To detach the cover, the user may place the cam locks in the open position and remove the cover, causing the pins to be separated from the cam locks.

A second type of mechanism to attach and detach a cover may include a toe-in and cinch mechanism. For example, the back surface of the computing device may include two openings that are relatively small in width. The cover may include a convex-shaped preload. To attach the cover, the user may insert one end of the cover into one of the openings on the computing device and insert the other end of the cover into the other opening on the computing device. To detach the cover, the user may remove one end of the cover from one of the openings on the back surface of the computing device and remove the other end of the cover from the other opening on the back surface of the computing device.

A third type of mechanism to attach and detach a cover may include a toe-in and latch mechanism. For example, one end of the back surface of the computing device may include an opening with a relatively small width and the other end of the computing device may include a latch. The cover may include a convex-shaped preload. To attach the cover, the user may insert one end of the cover into an opening on the computing device and close a latch on the other end of the computing device. To detach the cover, the user may open the latch on the other end of the computing device and remove one end of the cover from the opening on the computing device.

Thus, a detachable cover may be used to protect the external surface of the computing device and change an appearance of the external surface of the tablet computing device. The cover may include one or more layers of materials. The detachable cover may include a convex-shape to create a preload on the computing device after the cover is attached. The preload may cause the cover to exert a particular amount of pressure (e.g., structural tension) on the computing device, thereby preventing a gap from occurring between the cover and the computing device. The preload may provide one or more of (1) preventing debris from entering a gap between the cover and the computing device, (2) electrical connections between two (or more) housings, (3) provide thermal transfer between two (or more) housing, and (4) provide structural tensioning.

As a first example, a plurality of cam locks may be embedded into one or more housings of a computing device. A cover that can be attached to (or detached from) the computing device may include a plurality of pins. The cover may include one or more layers, such as, for example, a metal layer, a plastic layer, a cloth layer, another type of layer, or any combination thereof. To attach the cover to an external (e.g., outer surface) of the computing device, the plurality of cam locks may be placed in an open position, individual pins (of the plurality of pins) may be aligned with corresponding cam locks (of the plurality of cam locks), the individual pins may be inserted into the corresponding cam locks, and the individual cam locks may be moved from the open position to a closed position, thereby causing the cover to be attached to the external surface of the computing device. Moving the individual cam locks of the plurality of cam locks from the open position to the closed position may cause the individual cam locks to draw the individual pins further into an opening in each of the cam locks, such that the cover is substantially flush with the external (e.g., outer) surface of the computing device. To detach the cover from the computing device, the plurality of cam locks may be moved from the closed position to the open position and the cover removed from the computing device. The cover includes a curved portion that causes the cover to apply pressure to the outer surface of the computing device when the plurality of cam locks are in the closed position (e.g., when the cover is attached to the external surface of the computing device). Moving the individual cam locks of the plurality of cam locks from the closed position to the open position may cause one or more of the pins to automatically pop out (e.g., exit) the corresponding cam lock due to the pressure exerted by the curved portion of the cover. Each pin of the plurality of pins may include at least one of a pin head, a shaft, or a pin body. In some cases, the pin body may include threads that can be screwed into the cover to attach the pin to the cover. Each cam lock of the plurality of cam locks may include a tool engagement notch and an opening into which a corresponding pin of the plurality of pins may be inserted. A user may insert a tool into the tool engagement notch to move the cam locks between the open position and the closed position. In some embodiments, the computing device may include a first housing that includes a first display device, a second housing that includes a second display device, and one or more hinges that attach the first housing to the second housing. The one or more hinges may enable the first housing to positioned at an angle (e.g., between about 0 degrees to about 360 degrees) relative to the second housing. In some embodiments, the computing device may also include one or more sliders. Each slider may engage one or more of the cam locks. For example, moving the one or more sliders in a first direction may cause the one or more cam locks to be placed in the open position and moving the one or more sliders in a second direction (e.g., that is opposite from the first direction) may cause the one or more cam locks to be placed in the closed position.

As a second example, a computing device may include (1) a first housing that includes a first display device and a first set of cam locks, (2) a second housing that includes a second display device and a second set of cam locks, (3) a hinge coupling the first housing to the second housing, enabling the first housing to be placed at an angle relative to the second housing, and (4) a cover that includes a first set of pins coupled to the first set of cam locks in a closed position and a second set of pins coupled to the second set of cam locks in the closed position. The cover may include a curved portion that causes the cover to apply pressure to the outer surface of the computing device when the cover is attached to the computing device. The cover may be detached from the computing device by (1) placing the first set of cam locks in an open position and (2) placing the second set of cam locks in the open position. Placing the first and second set of cam locks in the open position may cause at least one pin of the first set of pins or the second set of pins to be extracted from a corresponding cam lock due to the pressure exerted by the cover to the outer surface of the computing device. In some embodiments, the computing device may include a first of sliders in the first housing to engage the first set of cam locks and a second of sliders in the second housing to engage the second set of cam locks. Sliding the first set of sliders in a first direction may cause the first set of cam locks to be placed in the open position and sliding the second set of sliders in the first direction may cause the second set of cam locks to be placed in the open position. Sliding the first set of sliders in a second direction (e.g., that is opposite from the first direction) may cause the first set of cam locks to be placed in the closed position and sliding the second set of sliders in the second direction may cause the second set of cam locks to be placed in the closed position. Moving individual cam locks of the first or second set of cam locks from the open position to the closed position may cause the individual cam locks to draw a corresponding pin further into an opening in each cam lock, such that an inner surface of the cover is substantially flush with an outer surface of the computing device. The cover may include one or more layers, such as a metal layer, a plastic layer, a cloth layer, another type of layer, or any combination thereof. Individual pins of the first and second set of pins may include at least one of: a pin head, a shaft, or a pin body. In some cases, the pin body may have threads that enable the pin to be screwed into a portion of the cover to attach the pin to the cover. Each cam lock may include a tool engagement notch and an opening into which an individual pin (e.g., of the first and second set of pins) may be inserted.

As a third example, individual pins of a plurality of pins fastened to a cover may be aligned with individual cam locks of a plurality of cam locks embedded into a computing device. The cam locks may be in an open position. The individual pins of the plurality of pins may be inserted into the individual (e.g., corresponding) cam locks of the plurality of cam locks. Moving the individual cam locks from the open position to a closed position may cause the cover to be attached to the external surface of the computing device. The cover may include a curved portion that causes the cover to exert pressure to the outer surface of the computing device in the closed position. Moving the individual cam locks of the plurality of cam locks from the closed position to the open position may cause at least one pin of the plurality of pins to exit from a corresponding one of the plurality of cam locks due to the pressure exerted by the cover to the outer surface of the computing device. In some embodiments, sliding a set of sliders that engage the plurality of cam locks in a first direction may cause the plurality of cam locks to move from the open position to the closed position. Sliding the set of sliders in a second direction (e.g., that is opposite from the first direction) may cause the one or more cam locks to move from the closed position to the open position.

FIG. 1 is a block diagram of an architecture 100 of a computing device that includes a crossbar switch according to some embodiments. The computing device 102 includes a graphics processing unit 104. The graphics processing unit 104 may be an independent device (e.g., integrated circuit) or may be part of a central processing unit 106. The GPU 104 may provide three video data outputs (e.g., three pipes). For example, a third video data output of the GPU 104 may be sent to a port 108. The port 108 may be used to connect an external display device to the computing device 102. In some implementations, the third video data output of the GPU 104 may be sent to a third display device of the computing device 102 (e.g., instead of to the port 108). The GPU 104 may provide a second video data output from an embedded DisplayPort (eDP) port 110. The GPU 104 may provide a third video data output from a DisplayPort (DP) port 112. First content 140(1) from the eDP 110 and second content 140(2) from the DP 112 may be sent to a crossbar switch 114. The crossbar switch 114 may be capable of routing the content 140 from the eDP 110 and the output from the DP 112 to either (or both) output 116(1) or output 116(2). The outputs 116 from the crossbar switch 114 may be sent to a DP-to-DSI converter 118. The DP-to-DSI converter 118 may convert a DisplayPort compliant signal into a display serial interface (DSI) compliant signal. For example, the DP-to-DSI 118(1) may provide two DSI lanes DSI0 120(1) and DSI1 122(1) to an internal display device 124(1). The internal display device 124(1) is a display device that is typically (e.g., in a computing device with a single display) connected to the eDP port 110. The DP-to-DSI 118(2) may receive the output 116(2) from the crossbar switch 114 and provide two DSI lanes DSI0 120(2) and DSI1 122(2) to the additional display device 124(2).

A controller 126 (e.g., an embedded controller) may receive data 136(1) to data 136(N) (where N>0) from one or more of (i) a device driver 130 (e.g., associated with GPU 104), (ii) an operating system 132 of the computing device 102, (iii) one or more sensors 134 associated with the computing device 102, or (iv) user input 142 provided by a user of the computing device 102. For example, the sensors 134 may include an accelerometer, a gyroscope, a magnetometer or a magnetic compass, a proximity sensor, a camera, another type of sensor, or any combination thereof. A user of the computing device 102 may provide the user input 142. In some cases, the user input 142 may override the data from one or more of the device driver 130, the operating system 132, or the sensors 134. For example, the controller 126 may use the data from one or more of the device driver 130, the operating system 132, or the sensors 134 to determine a particular routing and instruct the crossbar switch 114 to configure a particular routing. In some cases, the user may override the particular routing by providing the user input 142.

The computing device 102 may include a memory 138. The memory 138 may be used to store content, such as the first content 140(1) and the second content 140(2). At least one of the first content 140(1) or the second content 140(2) may include unprotected content or protected content (e.g., content protected using a DRM scheme).

The controller 126 may, based on the data 136, provide an instruction 128 to the crossbar switch 114 to select a routing that routes one or more of the first content 140(1) (from the eDP port 110) or the second content 140(2) (from the DP port 112) to one or more of the outputs 116(1) or 116(2). For example, the crossbar switch 114 may route the first content 140(1) from the eDP port 110 to the output 116(1) for display on the internal display device 124(1) and may route the second content 140(2) from the DP port 112 to the output 116(2) for display on the additional display device 124(2). As a second example, the crossbar switch 114 may route the first content 140(1) from the eDP port 110 to the output 116(2) for display on the additional display device 124(2) and may route the second content 140(2) from the DP port 112 to the output 116(1) for display on the internal display device 124(2). As a third example, the crossbar switch 114 may route the first content 140(1) from the eDP port 110 to both the output 116(1) and 116(2) for display on the internal display device 124(1) and the additional display device 124(2). As a fourth example, the crossbar switch 114 may route the second content 140(2) from the DP port 112 to both the output 116(1) and the output 116(2) for display on the internal display device 124(1) and the additional display device 124(2).

The controller 126 may determine which routing of the crossbar switch 114 to select based on (1) an orientation of the computing device 102, (2) a display mode 144 of the operating system 132, and (3) whether DRM-protected content is being displayed. The orientation of the computing device 102 may be determined based on which of the display devices 124(1) or 124(2) is "up" (when the computing device 102 is in a horizontal orientation) or which of the display devices 124(1) or 124(2) is "left" (when the computing device 102 is in a vertical orientation). For example, the operating system 132, such as Microsoft® Windows®, may provide three display modes 144: (a) extended desktop mode where the display devices 124(1) and 124(2) behave as if they were a single display device, (b) clone mode where each of the display devices 124(1) and 124(2) display the same content, or (c) single display mode, e.g., one of the display devices 124(1) or 124(2) is off and therefore not displaying any content. For example, single display mode may be used when the computing device is in a tablet orientation to turn off a particular display device (of the display devices 124(1) and 124(2)) that is not visible to (or facing) the user.

The operating system (OS) 132 may allow DRM protected content to be displayed on a single display device (e.g., either 124(1) or 124(2)) and prevent DRM protected content from being displayed across both of the displays in extended desktop mode (because in extended desktop mode, one of the display devices 124(1) or 124(2) is to be driven by output from the DP port 112). Therefore, DRM protected content may be displayed on only one of the display devices 124(1) or 124(2) in the extended desktop mode. Thus, in all three of the modes 144 (e.g., extended desktop mode, clone mode, or single display mode), the DRM protected content may be displayed on either the internal display device 124(1) or the additional display device 124(2) depending on which of the display devices 124(1) and 124(2) is visible to the user (e.g., based on the orientation of the computing device 102).

Typically, when viewing DRM protected content such as a movie or television show, the computing device may be in a horizontal (e.g., landscape) orientation. In any of the three display modes, if the internal display device 124(1) is "up" in the horizontal orientation, then the first content 140(1) from the eDP port 110 may be sent to the output 116(1) for display on the internal display device 124(1). In any of the three display modes, if the additional display device 124(2) is "up" in the horizontal orientation, then the first content 140(1) from the eDP port 110 may be sent to the output 116(2) for display on the additional display device 124(2). In the horizontal mode, in the extended desktop mode, other applications or other content may be displayed by the display device that is "down". In the horizontal mode, in the clone mode, the DRM protected content may be displayed on both the display device that is "up" and the display device that is "down" (e.g., the content is duplicated on each of the two display devices). In the horizontal mode, in the single display mode, the DRM protected content may be displayed on the display device that is "up" while no content may be displayed on the display device that is "down".

In a tablet orientation, in which the display device 124(1) is facing in an opposite direction from the display device 124(2), the controller 126 may determine that a particular display device of the display devices 124(1) or 124(2) is visible to the user based on the data 136 (including data from the user input 142). The controller 126 may send the instruction 128 to the crossbar switch 114 to select a routing that sends the first content 140(1) from the eDP port 110 to the particular display device that is visible to the user. By routing the output of the eDP port 110 to whichever of the display devices 124(1) or 124(2) is visible to the user, the display device is able to re-orient the content when the computing device 102 is rotated. In addition, DRM protected content may be displayed in FHD by sending the output of the eDP port 110, regardless of which of the display devices 124(1) or 124(2) is "up". In the tablet orientation, the output of the eDP port 110 may be sent to the internal display device 124(1) when the internal display device 124(1) is visible to the user and may be sent to the additional display device 124(2) when the additional display device 124(2) is visible to the user. The display device that is not visible to the user may either (i) be off (e.g., in the single display mode) or (ii) display the same content being displayed on the other display device (e.g., clone mode).

In a clamshell mode in which one of the display devices 124 is at the top and the other is at the bottom, the controller 126 may identify which of the display devices 124 is at the top based on the data 136 received from one or more of the device driver 130, the OS 132, the sensors 134, and the user input 142. In the clamshell mode, if the operating system 132 is in the extended display mode, then if the internal display device 124(1) is on top, the output of the eDP port 110 is routed to the internal display device 124(1) and the output of the DP port 112 is routed to the additional display device 124(2). If the additional display device 124(2) is on top, the output of the eDP port 110 is routed to the additional display device 124(2) and the output of the DP port 112 is routed to the internal display device 124(1). In the clamshell mode, if the operating system 132 is in the clone mode, then the output of the eDP port 110 is routed to both the internal display device 124(1) and to the additional display device 124(2). As previously discussed, DRM protected content is displayed on the display device(s) to which the output of the eDP port 110 is routed (e.g., to the display device that is determined to be at the top in single display mode or to both display devices in clone mode). DRM protected content may not be displayed in FHD resolution in extended display mode because the output of the DP port 112 is encrypted and both the internal display device 124(1) and the additional display device 124(2) lack the circuitry to decrypt and display content in FHD resolution. If DRM protected content is played back while the OS 132 is in the extended desktop mode, the DRM protected content may be shown in standard definition (SD) resolution or may not be displayed at all, depending on the type of content and the DRM constraints.

In the extended desktop mode, DRM protected content may be displayed by routing the content from the eDP port 110 to one of the display devices 124(1) or 124(2). For example, playing a movie in "full screen" expands the movie to fill the particular display device that is connected to the eDP port 110. The OS 132 may, based on the DRM protection, prevent the movie from being displayed stretched across both the display devices 124(1) and 124(2). Clone mode does not violate the DRM protection because the first content 140(1) is sent from the eDP port 110 and duplicated on both of the display devices 124(1) and 124(2). In the extended desktop mode, unprotected content may be displayed stretched across both of the display devices 124(1) and 124(2) by sending half of the unprotected content from the eDP port 110 and a remaining half of the unprotected content from the DP port 112.

The GPU 104 may support three logical pipes (e.g., three video outputs). An advantage of using the crossbar switch 114 to drive both of the display devices 124(1) and 124(2) is that a single output port (e.g., the eDP port 110 or the DP port 112) of the GPU 104 is used. For example, by using a single logical pipe (e.g., a single output port) to drive both of the display devices 124(1) and 124(2) in clone mode for protected/unprotected content or in extended desktop mode for unprotected content, the two remaining logical pipes may be used to drive one or two external displays (e.g., via the port 108). In clone mode, if the crossbar switch 114 was not present, then the GPU 104 would use two logical pipes (e.g., the eDP port 110 and the DP port 112) to send the content to both the display devices 124(1) and 124(2), thereby leaving a single pipe to drive an external display (e.g., via the port 108). In some implementations, the computing device 102 may include a third display device, with each of the three logical pipes of the GPU 104 capable of driving each of the three display devices.

Table 1 summarizes the various possible routings and which port(s) are used based on (i) whether DRM content is being played back and (ii) the display mode 144 of the operating system 132 has been selected. If the content does not have DRM protection in either single display mode or clone mode, then either of the eDP port 110 or the DP port 112 may be used. Though Table 1 does not include an entry, in some implementations, unprotected content may be routed from the DP port 112 to either of the display devices 124(1) or 124(2) in single display mode or to both of the display devices 124(1) and 124(2) in clone mode. Because there is no advantage to using the DP port 112 for unprotected content in single display mode or clone mode and because the normal routing uses the output of the eDP port 110, if content does not have DRM protection in clone mode (or single display mode), then the output of the eDP port 110 is routed both (or one) of the display devices 124(1) and 124(2).

As the examples in Table 1 illustrate, in the extended desktop mode, DRM protected content is output in an unencrypted format from the eDP port 110 and sent to either the internal display device 124(1) or the additional display device 124(2) while unprotected content is output from the DP port 112 and sent to the other display device. For example, if the output of the eDP port 110 is sent to the internal display device 124(1) then the output of the DP port 112 is sent to the additional display device 124(2). If the output of the eDP port 110 is sent to the additional display device 124(2) then the output of the eDP port 110 is sent to the internal display device 124(1).

TABLE 1

| DRM | OS Display Mode | Routing | eDP Port Output | DP Port Output |
|---|---|---|---|---|
| Yes | Single Display Mode | eDP Only | Either Internal or Additional Display | Not Used |

TABLE 1-continued

| DRM | OS Display Mode | Routing | eDP Port Output | DP Port Output |
| --- | --- | --- | --- | --- |
| Yes | Clone Mode | eDP Only | Both Displays | Not Used |
| Yes | Extended Desktop Mode | Normal or Swap | One of the two displays | The other of the two displays |
| No | Single Display Mode | eDP Only | Either Internal or Additional Display | Not Used |
| No | Clone Mode | eDP Only or DP Only | Both Display Devices or Not Used | Both Display Devices or Not Used |
| No | Extended Desktop Mode | Normal or Swap | Internal or Additional Display Device | Internal or Additional Display Device |

Thus, a portable all-in-one computing device may include two display devices. An embedded controller may receive data from one or more sensors in the computing device and determine an orientation and position of at least one of the display devices. The embedded controller may modify content being sent to one or both of the display devices. In some cases, the content may be protected using a DRM scheme, such as HDCP. The content may be modified by rotating the content between approximately 0 degrees and approximately 360 degrees. For example, in some cases, the content may be rotated to the right or to the left and by 90 degrees, 180 degrees, or 270 degrees. The embedded controller may route the content being sent to one or both of the display devices based on the data received from the sensors and based on whether the additional display is configured as an extension or a clone of the internal display. In this way, a user can pick up the computing device and use it in different configurations and the embedded controller automatically (e.g., without human interaction) modifies and routes the content to one or both of the displays.

Thus, the controller 126 may receive the data 136(1) to 136(N) from one or more of the device driver 130, the operating system 132, or the sensors 134. The controller 126 may determine an orientation of the computing device 102 based on the data 136. Based on the orientation of the computing device 102, the controller 126 may rotate the content being displayed between approximately 0 degrees and approximately 360 degrees. For example, in some cases, the content may be rotated to the right (clockwise) or to the left (counter-clockwise) in 90 degree increments (e.g., 90 degrees, 180 degrees, or 270 degrees). Based on (a) the display mode 144 (e.g., single mode, clone mode, or extended desktop mode) of the OS 132, and (b) whether the content being displayed is protected using DRM, the controller 126 may select a routing and send the instruction 128 to the crossbar switch 114 selecting the routing. The instruction 128 may cause the crossbar switch 114 to be configured to perform the selected routing. In some cases, a user may provide the user input 142 to modify (or override) the orientation determined by the controller 126, the routing determined by the controller 126, or both. If the orientation of the computing device 102 changes while the content is being displayed, the controller 126 may receive new data 136, determine a new orientation, determine a new routing, and automatically instruct the crossbar switch 114 to configure a new routing. Based on the new orientation of the computing device 102, the controller 126 may rotate the content being displayed between approximately 0 degrees and approximately 360 degrees. For example, in some cases, the content may be rotated to the right (clockwise) or to the left (counter-clockwise) in 90 degree increments (e.g., 90 degrees, 180 degrees, or 270 degrees). In some cases, the user input 142 may cause the controller 126 to "lock" a particular routing configuration, a particular orientation, or both, such that the controller 126 ignores any additional data received from one or more of the device driver 130, the OS 132, or the sensors 134 until the user input 142 causes the controller 126 to remove the "lock".

While the examples herein use a computing device with two display devices, the systems and techniques may also be extrapolated for use with computing devices having more than two display device. The crossbar switch may be used to route the content from an eDP port and a DP port to (1) a first (e.g., internal) display, (2) a second (e.g., additional) display or (3) both the first display and the second display of an all-in-one computing device that includes two display devices. For example, data from sensors, such as an accelerometer, a gyroscope, a magnetometer or a magnetic compass, a proximity sensor, a camera, or other types of sensors included in the computing device may be provided to a graphic processing unit (GPU). The GPU may adjust the orientation (e.g., landscape or portrait) and position (e.g., top/bottom or left/right) of the content being sent to the two displays based on the data. Without the crossbar switch, a user of the computing device would be tasked with (i) knowing which display device the computing device considered to be the internal (e.g., primary or embedded) display device and (ii) manually orienting the displays accordingly. By using the crossbar switch, as the orientation and position of the first display and the second display changes, the computing device is able to automatically re-route the content being displayed based on the orientation.

In a computing device with two display devices, the crossbar switch may be used to select one of four possible routings: (1) normal, (2) swap, (3) eDP only, or (4) DP only. The normal routing sends the output of the eDP port to the internal display device and sends the output of the DP port to the additional display device (e.g., considered an external display device by the GPU and OS). The swap routing sends the output of the DP port to the internal display device and sends the output of the eDP port to the additional display device. The eDP only routing sends the eDP port output to both display devices. The DP only routing sends the DP port output to both display devices.

When protected content is output from the eDP port, the protected content is output in an unencrypted format (e.g., without any protection) because the output of the eDP port is intended for an internal display device. The output of the eDP port can be displayed in full high definition (FHD) resolution (at least 1280×720 pixels) on the internal display. If the protected content is output from the DP port, the DP port is designed to assume that the output is being sent to an external display that supports DRM (e.g., HDCP). Therefore, DRM protected content is output from the DP port in an encrypted format, such as encrypted using HDCP. If the additional display device connected to the DP port does not support HDCP, as is the case in an all-in-one computing device with two display devices, then the protected content may not display in FHD mode. Instead, the encrypted content (i) may be displayed in standard definition (e.g., a resolution of less than 1280×720 pixels) or (ii) may not be displayed. The crossbar switch enables the unencrypted content that is output from the eDP port to be routed to the additional display device (instead of to the internal display device) based on the orientation and position of each of the two display devices. The crossbar switch thus enables a user (i) to use a computing device that includes two display devices in any orientation and (ii) to display protected content in FHD without having paying attention to which display device is the "primary" (e.g., internal) display device and which is the "secondary" (e.g., additional) display device.

Figure 2:
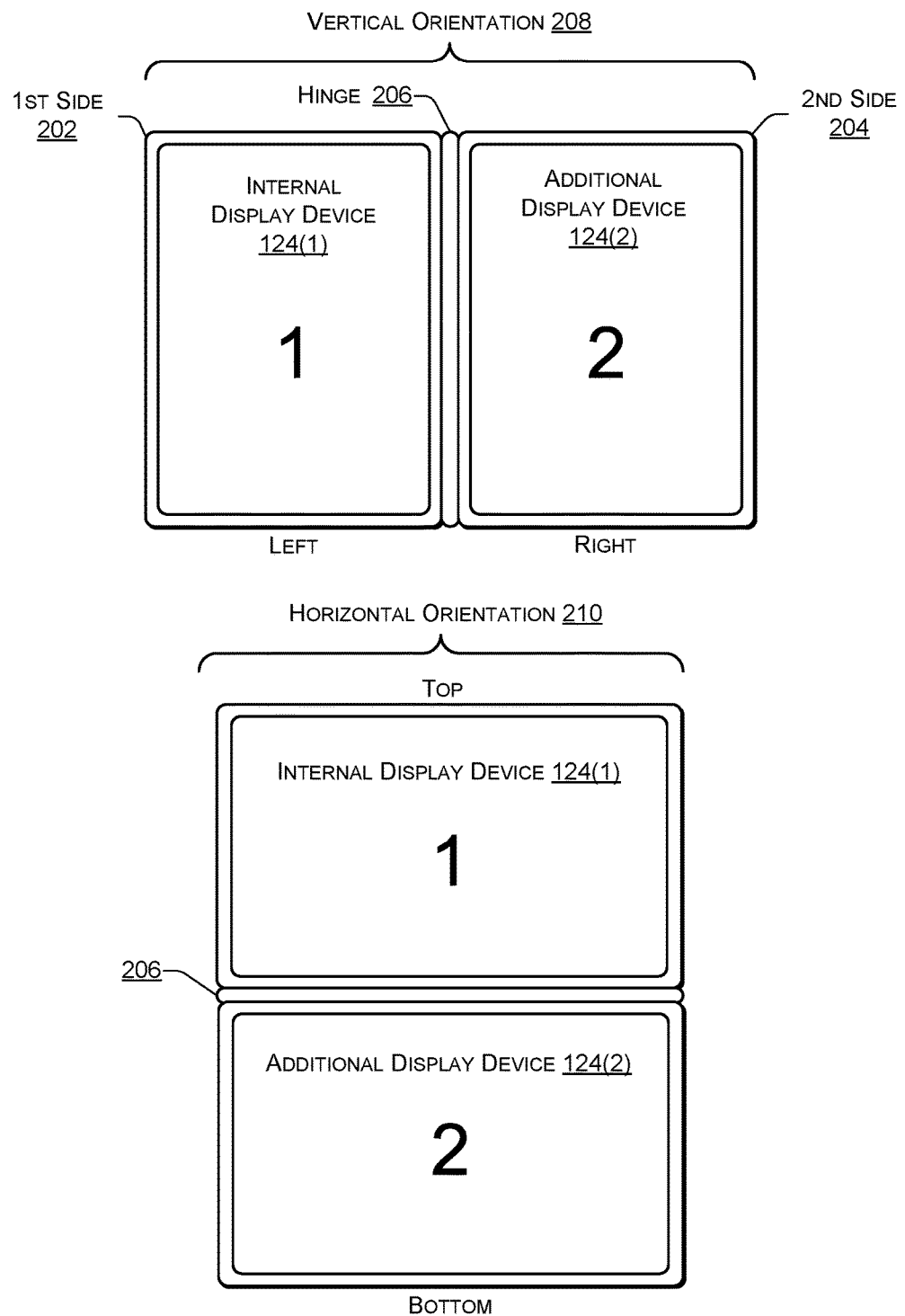
FIG. 2 is a block diagram illustrating different orientations of a dual-screen device according to some embodiments.

FIG. 2 is a block diagram illustrating different orientations of a dual-screen device (e.g., the computing device 102 of FIG. 1) according to some embodiments. The computing device 102 may include at least two display devices, the internal display device 124(1) and the additional display device 124(2). The computing device 102 may include a first side 202 (e.g., first housing) coupled to a second side 204 (e.g., second housing) by at least one hinge 206.

Figure 3:
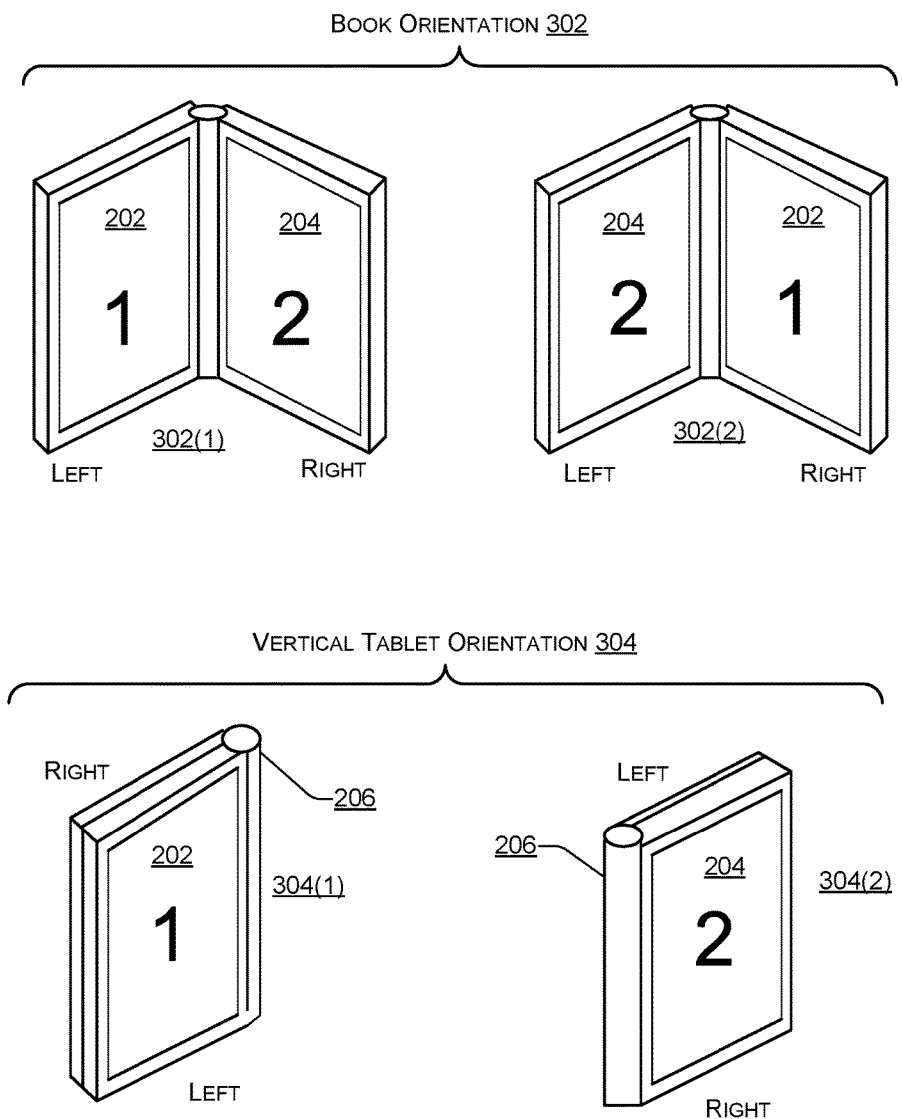
FIG. 3 is a block diagram illustrating modes of a dual-screen device in a vertical orientation according to some embodiments.

The computing device 102 may be displayed in a vertical (e.g., portrait) orientation 202 or a horizontal (e.g., landscape) orientation 204. For example, in the vertical orientation 208, the internal display device 124(1) may be on one side (e.g., the left side or the right side), the additional display device 124(2) may be on another side (e.g., the right side or the left side), and a hinge 206 may join the internal display device 124(1) to the additional display device 124(2). Additional examples of the vertical orientation 208 are illustrated in FIG. 3. In the vertical orientation 210, the internal display device 124(1) may be located at the top (or the bottom) of the computing device 102 with the hinge 206 in the middle and the additional display device 124(2) at the bottom (or the top) of the computing device. Additional examples of the vertical orientation 210 are illustrated in FIG. 4.

FIG. 3 is a block diagram illustrating modes of a dual-screen device in a vertical orientation according to some embodiments. Examples of the vertical orientation 208 may include a book orientation 302 or a vertical tablet orientation 304. For example, in a first book orientation 302(1), the first side 202 (e.g., including the internal display device 124(1)) may be on the left and the second side (including the additional display device 124(2)) may be on the right. Alternately, in a second book orientation 302(2), the second side 204 may be on the left and the first side 202 may be on the right.

In a first vertical tablet orientation 304(1), the first side 202 may be facing a user and the second side 204 may be rotated approximately 360 degrees to face away from the user. In a second vertical tablet orientation 304(2), the second side 204 may be facing the user while the first side 202 may rotated approximately 360 degrees to face away from the user.

Figure 4:
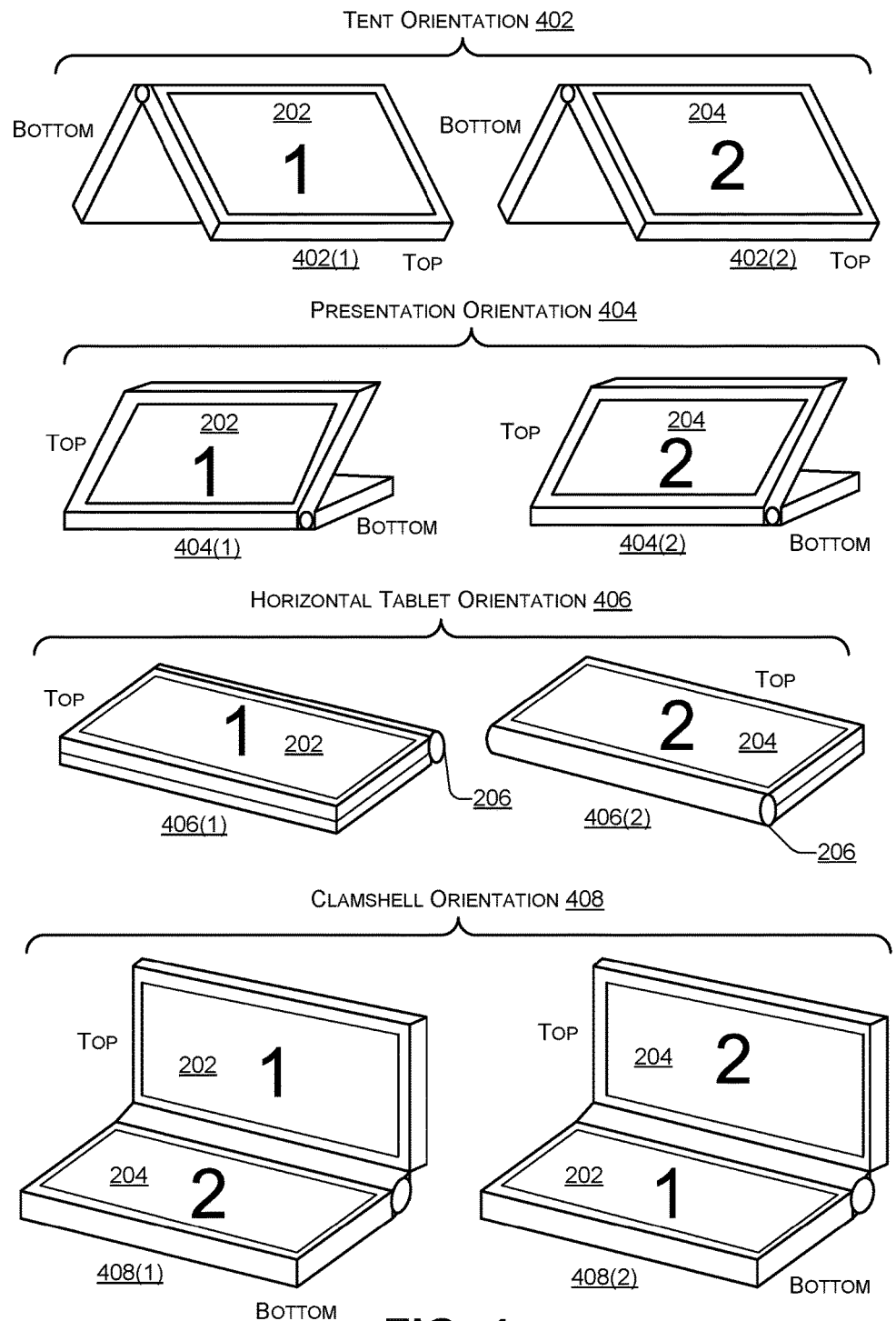
FIG. 4 is a block diagram illustrating modes of a dual-screen device in a horizontal orientation according to some embodiments.

FIG. 4 is a block diagram 400 illustrating modes of a dual-screen device in a horizontal orientation according to some embodiments. Examples of the vertical orientation 210 may include a tent orientation 402, a presentation orientation 404, a horizontal tablet orientation 406, and a clamshell orientation 408.

In 402(1), the first side 202 (e.g., including the internal display device 124(1)) may be at the top facing the user while the second side 204 (e.g., including the additional display device 124(2)) may be at the bottom facing away from the user. In 402(2), the second side 204 may be at the top facing the user and the first side 202 may be at the bottom facing away from the user.

In 404(1), the first side 202 may be at the top facing the user and the second side 204 may be at the bottom facing down. In 404(2) the second side 204 may be at the top facing the user and the first side 202 may be at the bottom facing down.

In 406(1), the first side 202 may be at the top facing the user and the second side 204 may be at the bottom facing down (e.g., away from the user). In 406(2), the second side 204 may be at the top facing the user and the first side 202 may be at the bottom facing down (e.g., away from the user).

In 408(1), the first side 202 may be at the top facing the user and the second side 204 may be at the bottom facing the user (e.g., in a position where traditionally, a keyboard is located in a laptop). In 408(1), in some cases, a QWERTY-based keyboard may be displayed on the second side 204 and used to receive keyboard input. In 408(2), the second side 204 may be at the top facing the user and the first side 202 may be at the bottom facing the user (e.g., in a position where traditionally, a keyboard is located in a laptop). In 408(2), in some cases, a QWERTY-based keyboard may be displayed on the first side 202 and used to receive keyboard input.

Figure 5:
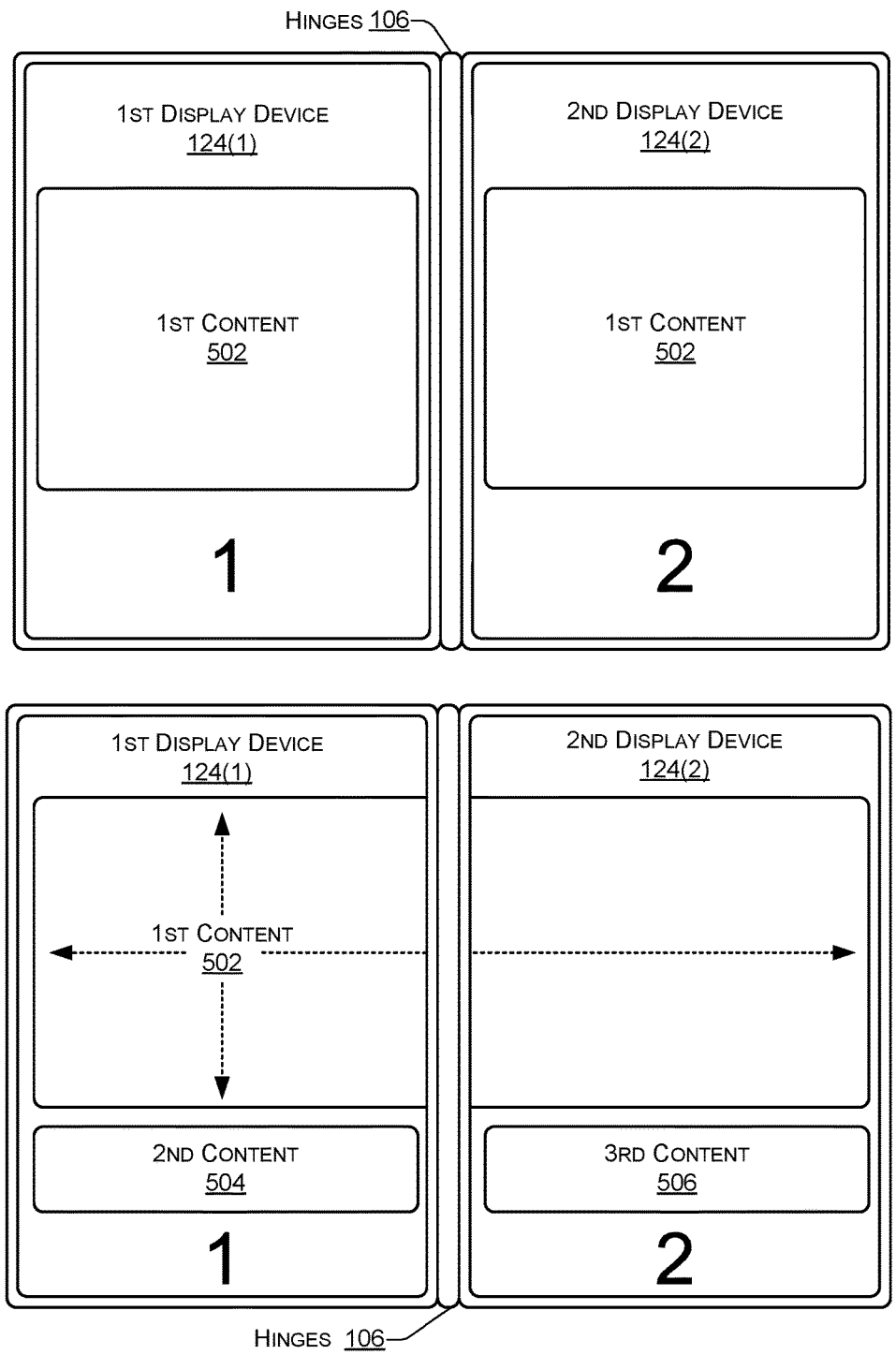
FIG. 5 is a block diagram illustrating different modes of a dual-screen device according to some embodiments.

FIG. 5 is a block diagram illustrating different modes of a dual-screen device according to some embodiments. The top half of FIG. 5 illustrates when an operating system of the dual-display device is set to display content in a clone mode or in a single display mode. In the clone mode, first content 502 may be displayed both on the first display device 124(1) and on the second display device 124(2). In the single display mode, the first content 502 may be displayed on either (but not both) of the first display device 124(1) or the second display device 124(2).

The bottom half of FIG. 5 illustrates when an operating system of the dual-display device is set to display content in an extended display mode, in which the second display device 124(2) is setup as an extension of the first display device 124(1). In the extended display mode, some content, such as the first content 502, may be displayed across both the first display device 124(1) and the second display device 124(2). In some cases, additional content may be displayed on either the first display device 124(1) or the second display device 124(2). For example, second content 504 may be displayed on the first display device 124(1) and third content 506 may be displayed on the second display device 124(2).

Figure 6:
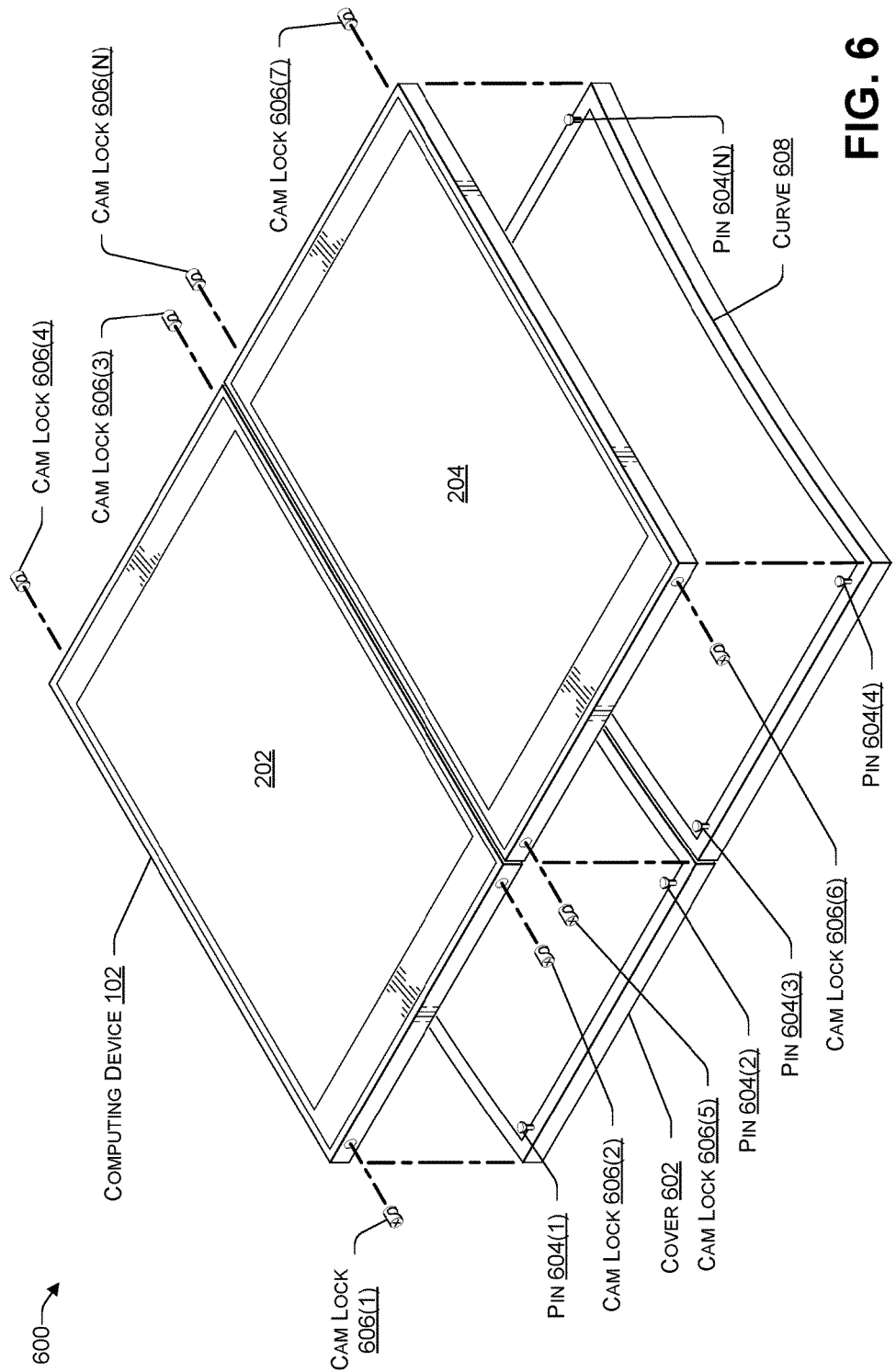
FIG. 6 is a block diagram illustrating a detachable cover for a single screen or multi-screen device according to some embodiments.

FIG. 6 is a block diagram 600 illustrating a detachable cover for a computing device (e.g., single screen or multi-screen) according to some embodiments. A cover 602 may include N pins 604(1) to 604(N) (where N>1). For example, the cover 602 may include a pin to fit into each of the 4 corners of (i) the side 202 and (ii) the side 204 (e.g., N=8). The computing device 102 may include a corresponding hole into which a cam lock is placed. For example, the computing device 102 may include cam locks 606(1), 606(2), 606(3), and 606(4) in each of the 4 corners of the first side 202 and cam locks 606(5), 606(6), 606(7), and 606(N) (N=8 in this example) in each of the 4 corners of the second side 204. Of course, there may be more (or less) than 4 cam locks in each of the sides 202, 204. For example, there may be a cam lock in each corner and at approximately a mid-point of each side 202, 204, for a total of 16 cam locks. The cover 602 may be convex shaped to provide a pre-load. For example, the cover 602 may include a curve 608.

To attach the cover 602, the user may place the cam locks 606 in an open position, align the cover 602 with the computing device 102 such that the pins 604 are aligned with openings in the cam locks 606, and place the cam locks 606 in a closed position. In the closed position, the cam locks 606 may be positioned such that a top surface of the cam locks 606 is flush with an outer surface of the computing device 102. To detach the cover 602, the user may place the cam locks 606 in the open position, causing the pins 604 to be separated from the cam locks 606, and enabling the user to remove the cover 602. After the cam locks 606 have been placed in the open position, the curve 608 in the cover 602 may result in the pressure of the preload causing the pins 604 to automatically pop out of the holes in the cam locks 606.

Various mechanisms may be used to move the cam locks 606 from the open position to the closed position or from the closed position to the open position. For example, a user may be provided with a tool, such as a screwdriver or other tool, that enables the user to manually move the cam locks 606 from the open position to the closed position or from the closed position to the open position. As another example, the cam locks 606 may have striations on an outer surface of each cam lock. A sliding ("slider") piece of material (e.g., plastic, metal or the like) may be placed on each edge of the computing device 102 that includes a cam lock. The slider may include grooves that engage with the striations of the cam locks 606. For example, the user may slide a slider on a particular edge of the computing device in a first direction, causing the cam locks on the particular edge to simultaneously move from the closed position to the open position. The user may slide the slider in a second direction to cause the cam locks on the particular edge to simultaneously move from the open position to the closed position. Of course, other mechanisms may be used to move the cam locks 606 between the open position and the closed position.

The cover 602 may include three sections, e.g., a first section (corresponding to the first side 202), a second section (corresponding to the second side 204), and a relatively narrow middle section (corresponding to the hinge 206 of the computing device 102) that attaches the first section to the second section. The middle section may enable the first and second sections of the cover 602 to rotate relative to each other (e.g., between 0 and 360 degrees) in accordance with the movement of the first side 202 and the second side 204. Both the first section and the second section may include the curve 608. The middle section may not include the curve 608. For example, the first section and the second section may each include a layer of a relatively hard material (e.g., plastic, metal, or the like) while the middle section includes a layer of a flexible material (e.g., cloth, bendable plastic, or the like).

Figure 7:
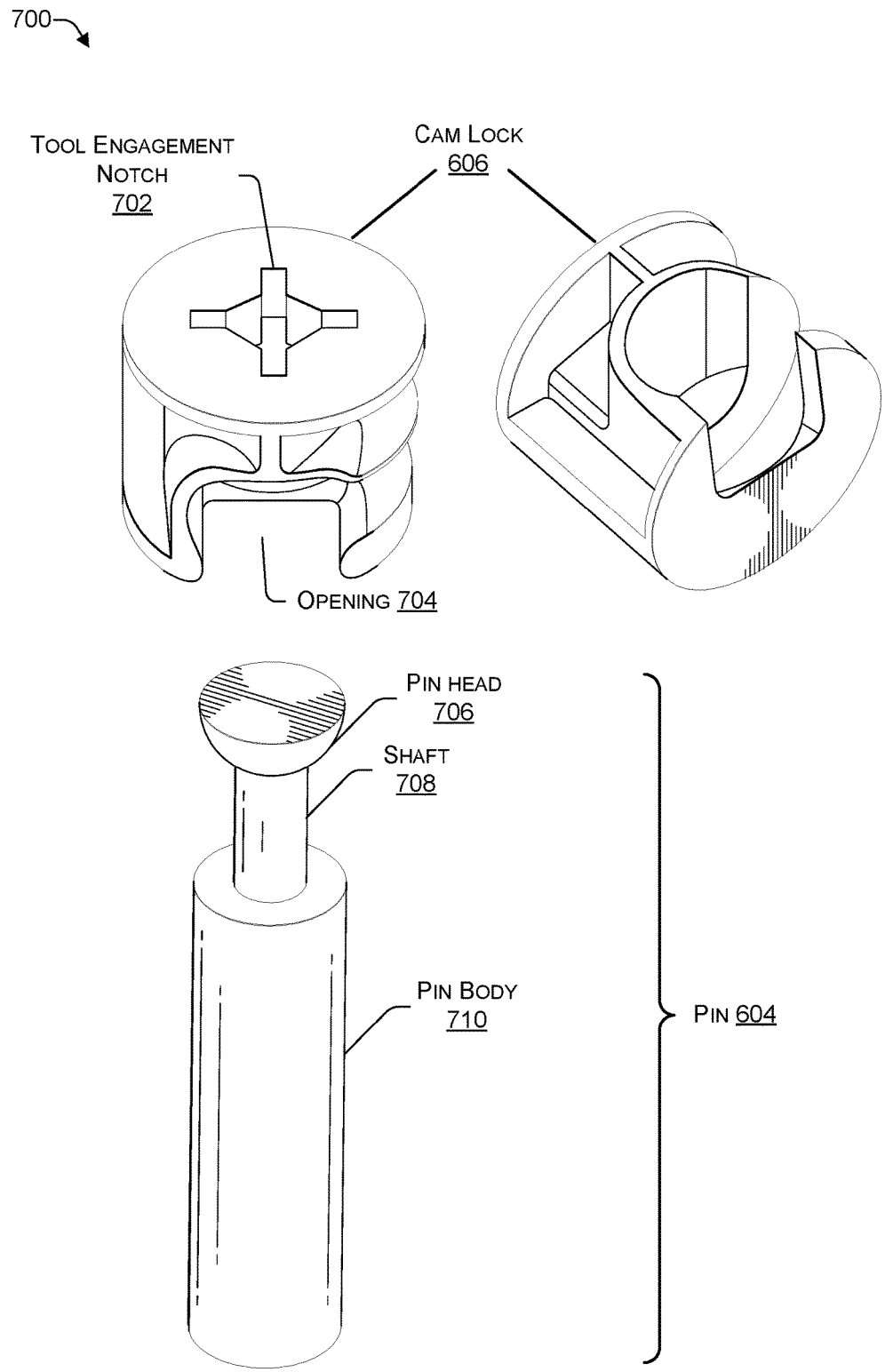
FIG. 7 is a block diagram illustrating a cam lock and pin system for attaching and detaching a cover to a computing device according to some embodiments.

FIG. 7 is a block diagram 700 illustrating a cam lock and pin system for attaching and detaching a cover to a computing device according to some embodiments. Each cam lock 606 may be approximately cylindrical in shape, with a tool engagement notch 702 on a first plane surface. The user may insert a tool, such as a screwdriver, into the tool engagement notch 702 to move the cam locks 606 between the open position and the closed position. Each cam lock 606 may include an opening 704 that encompasses part of a second plane surface and part of the curved surface. The second plane surface may be on an opposite edge of the cam lock 606 relative to the first plane surface. The cam lock 606 may be made out of a metal, a metal alloy, a plastic, or another type of material.

The pin 604 may include a pin head 706 that may be inserted into the opening 704 of the cam lock 606 when the cam lock 606 is in the open position. When the cam lock is moved to the closed position, the cam lock 606 may twist in such a way as to lock the pin head 706 in place. The pin head 706 of the pin 604 may not be removed from the opening 704 of the cam lock 606 when the cam lock is in the closed position, thereby securing the cover 602 of FIG. 6 to the computing device 102. The pin 604 may include a shaft 708. In some cases, the pin 604 may include a pin body 710. The pin body 710 may be attached to the cover 602 using glue, a rivet, or another type of fastener. In some cases, the pin body 710 may be threaded at an end opposite the pin head 706 to enable the pin 604 to be fastened by screwing the threads into the cover 602. The pin 604 may be made out of a metal, a metal alloy, a plastic, or another type of material.

Figure 8:
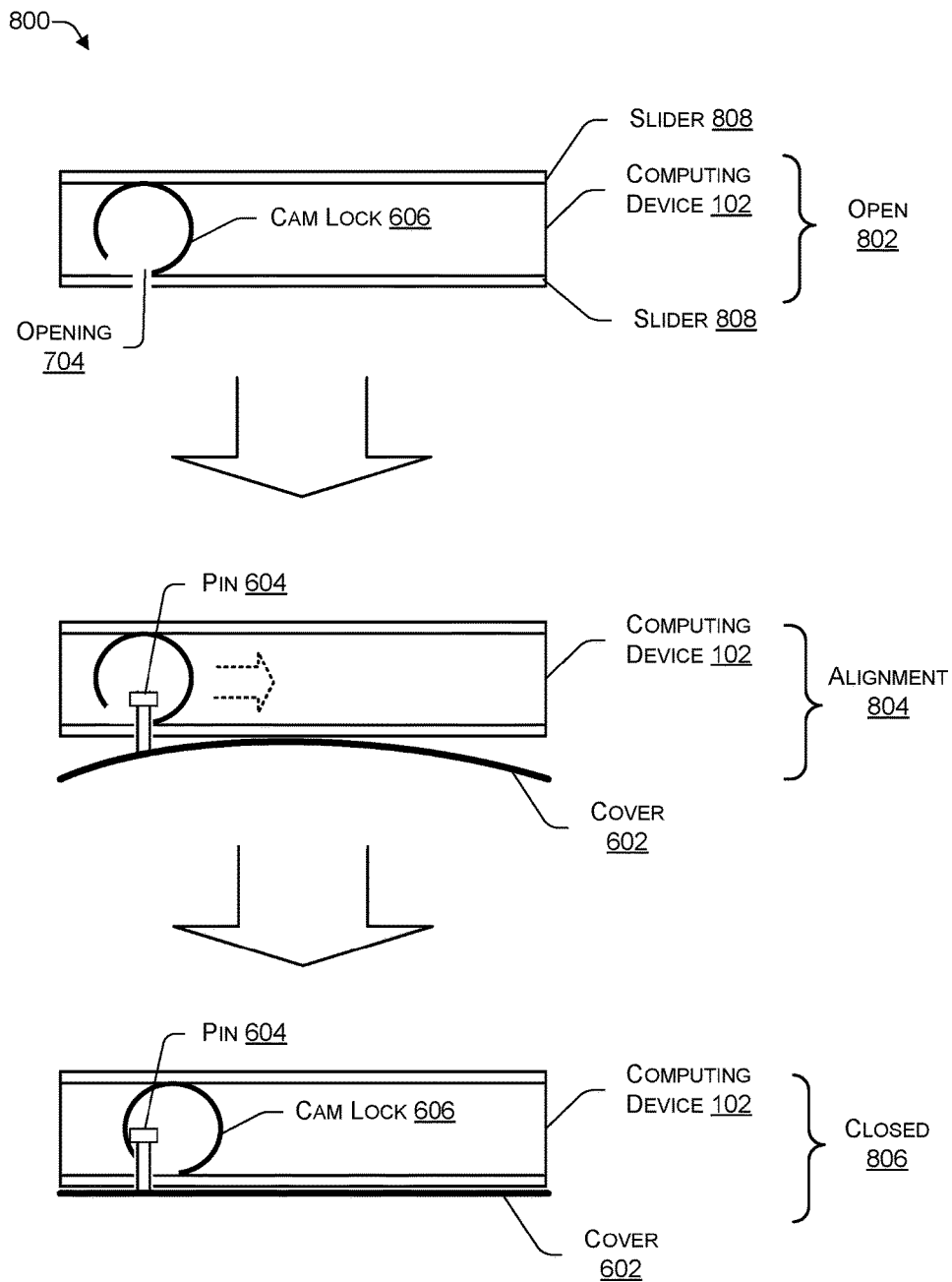
FIG. 8 is a block diagram illustrating an open position and a closed position of a cam lock according to some embodiments.

FIG. 8 is a block diagram 800 illustrating an open position and a closed position of a cam lock according to some embodiments. To attach the cover 602 to the computing device 102, the user may place each cam lock 606 in an open 802 position. The user may align 804 each pin 604 with the opening 704 of each cam lock 604. After the alignment 804 has been performed, the user may bring the cover 602 closer to the computing device 102 such that the pin 604 enters into the opening 704. The user may perform an action, such as using a tool (e.g., screwdriver) or moving a slider 808 in a first direction (as indicated by the dotted arrow in FIG. 8) to cause the cam lock 606 to rotate into a closed 806 position that locks the pin 604 in place, thereby attaching the cover 602 to the computing device 102. The movement of the cam lock 606 as it moves from the open 802 position to the closed 806 position may draw the pin 604 further into the opening 704, thereby straightening the cover 602 such that the cover 602 is substantially flush with an outer surface of the computing device 102. The curve of the cover 602 may preload the cover 602 and cause the cover 602 to exert a small amount of pressure on the outer surface of the computing device 102. In the closed position 806, the cam lock 604 may place a particular amount of tension between the cover and the pin, e.g., in the closed position 806, the cam lock 604 may pull the cover 604 tight up against the outer surface of the computing device 102. In some cases, the cam lock 606 may have detents on the surface on which the head of the pin 604 rides, allowing the number of detents ("clicks") of the cam lock 606 is to be turned to be specified, to allow for different pre-determined tensions. For example, the user may be instructed to use an Nth detent (N>0) to secure the cover 602 to the computing device 102. To illustrate, the instruction manual may instruct the user to use a tool to turn the cam lock 606 and stop turning after the user hears N−1 clicks, indicating the Nth detent.

To remove the cover 602 from the computing device 102, the process described above may be reversed. For example, the user may perform an action, such as using a tool (e.g., screwdriver) or moving the slider 808 in a second direction (in an opposite direction from the dotted arrow in FIG. 8) to cause the cam lock 606 to rotate from the closed 806 position to the open 802 position. The movement of the cam lock 606 as it moves from the closed 806 position to the open 802 position may cause the pin 604 to be removed from the opening 704. In some cases, the tension caused by the preload (e.g., the curve of the cover 602) may cause the pin 604 to automatically pop out of the opening 704 when the cam lock 606 is moved from the closed 806 position to the open 802 position.

In some cases, there may be striations on an outer surface of each cam lock 606. The slider 808 that is made of plastic, metal, or the like may include a surface (e.g., grooves) that engages with the striations of the cam lock 606. For example, cam locks 606, pins 604, or both may include a metal having a particular type of thermal conductivity to move heat from each housing to the outside edges of the cover 602.

Figure 9:
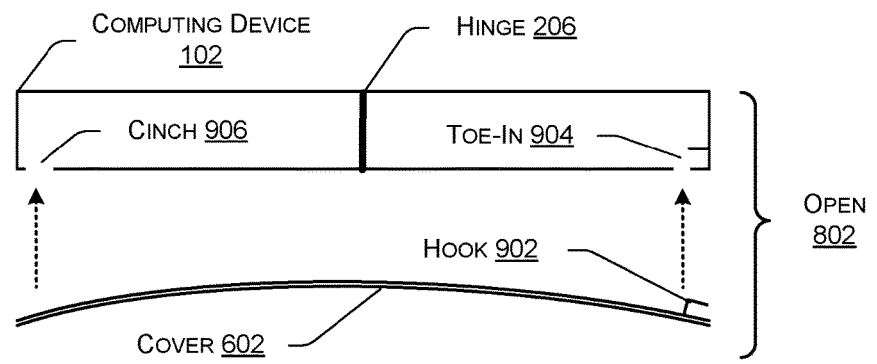
FIG. 9 is a block diagram illustrating a toe-in and cinch system for attaching and detaching a cover to a computing device according to some embodiments.
Figure 9:
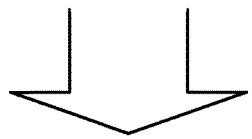
Figure 9:
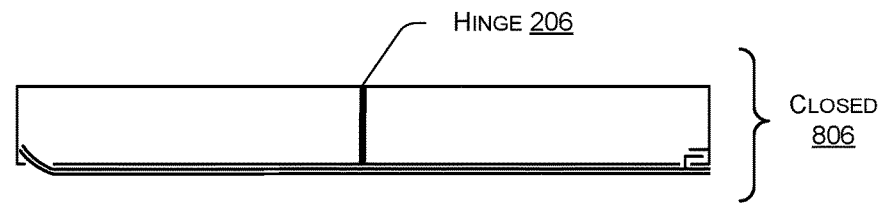

FIG. 9 is a block diagram 900 illustrating a toe-in and cinch system for attaching and detaching a cover to a computing device according to some embodiments. To attach the cover 602 to the computing device 102, the user may, in the open 802 position, place a hook 902 on one end of the cover 602 into a toe-in 904 opening of the computing device. The user may insert an opposite end of the cover 602 into a cinch 906 opening, thereby securing the cover 602 into the closed 806 position. The curve may preload the cover 602, causing the cover 602 to exert a small amount of pressure on the outer surface of the computing device 102.

To remove the cover 602 from the computing device 102, the user may remove the opposite end of the cover 602 from the cinch 906 and remove the hook 902 from the toe-in 904 opening of the computing device 102.

Figure 10:
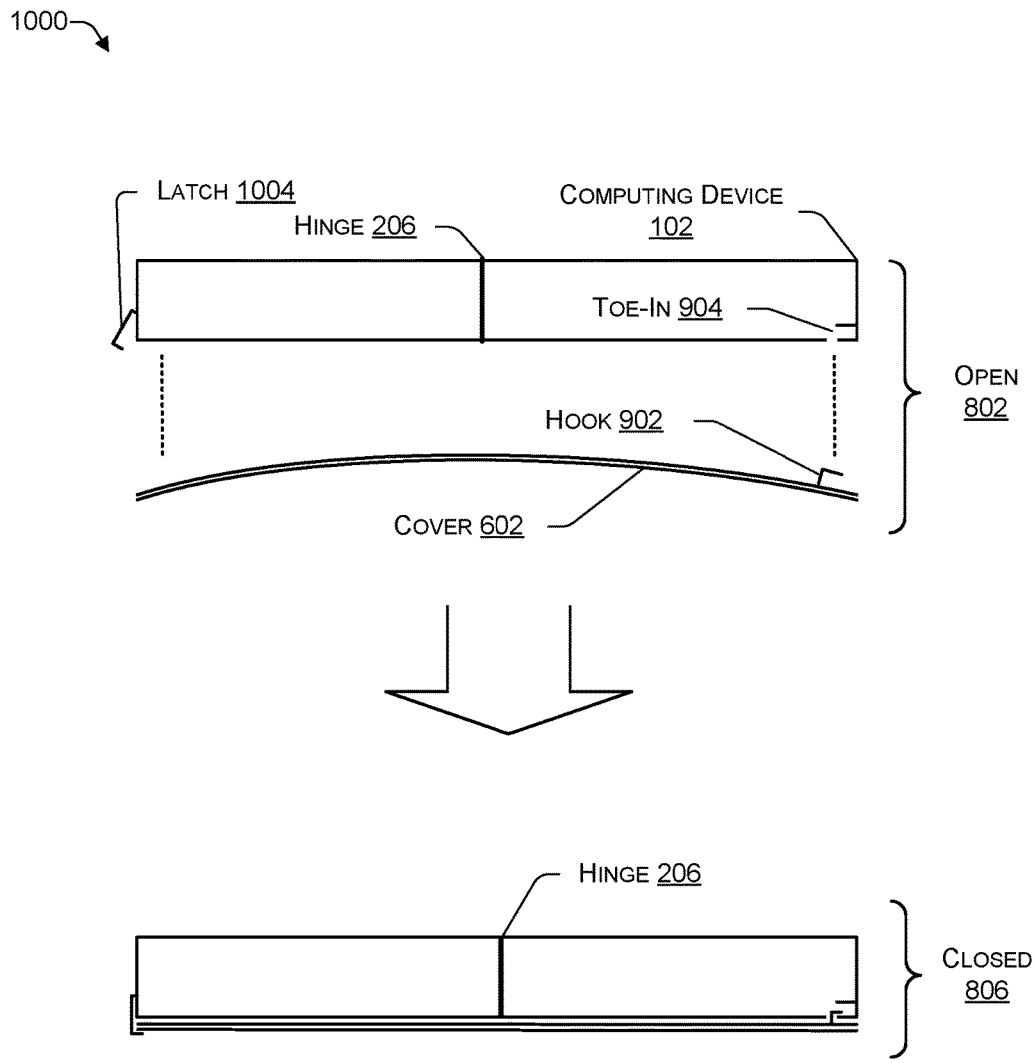
FIG. 10 is a block diagram illustrating a toe-in and latch system for attaching and detaching a cover to a computing device according to some embodiments.

FIG. 10 is a block diagram 1000 illustrating a toe-in and latch system for attaching and detaching a cover to a computing device according to some embodiments. To attach the cover 602 to the computing device 102, the user may, in the open 802 position, place the hook 902 into the toe-in 904 opening of the computing device. The user may move an opposite end of the cover 602 at an edge of the computing device 102 and close a latch 1004, thereby securing the cover 602 into the closed 806 position. The curve may preload the cover 602, causing the cover 602 to exert a small amount of pressure on the outer surface of the computing device 102. To remove the cover 602 from the computing device 102, the user may open the latch 1004 and remove the hook 902 from the toe-in 904 opening of the computing device 102.

Figure 11:
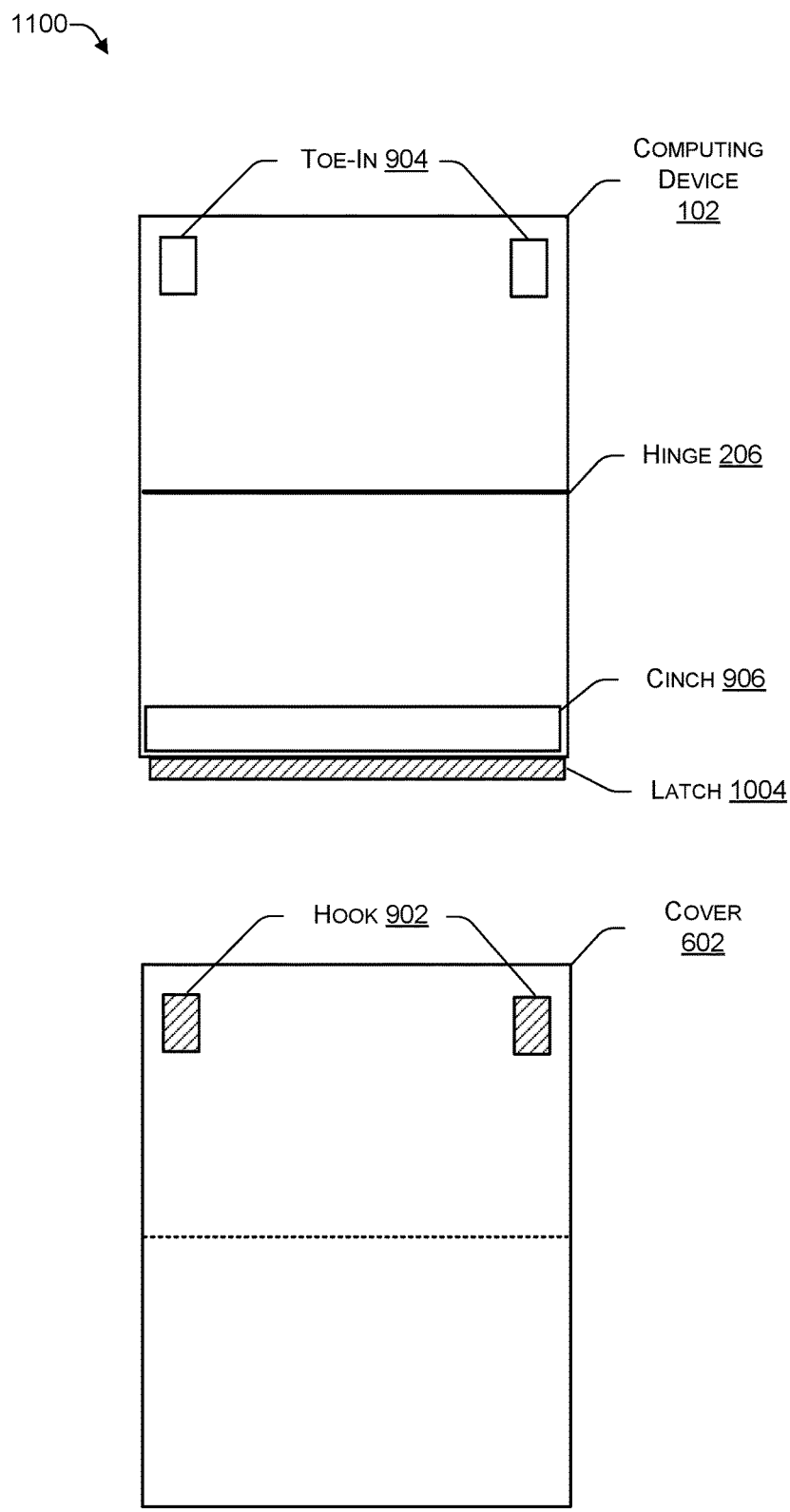
FIG. 11 is a block diagram illustrating a different perspective of a toe-in system for attaching and detaching a cover to a computing device according to some embodiments.

FIG. 11 is a block diagram 1100 illustrating a different perspective of a toe-in system for attaching and detaching a cover to a computing device according to some embodiments. FIG. 11 illustrates an outer surface of the computing device 102 and an inner surface of the cover 602.

One particular end of the computing device 102 may include one or more toe-in 904 openings. In some cases, a single toe-in 904 opening may run the length of the one particular end of the computing device 102. In other cases, two or more toe-in 904 openings may be present in the one particular end of the computing device 102. For a toe-in and cinch mechanism, another particular end of the computing device 102 may include the cinch 906 opening. For a toe-in and latch mechanism, another particular end of the computing device 102 may include the latch 1004.

The cover 602 may include one or more of the hooks 902 that correspond to the toe-in 904 openings. To attach the cover 602 to the computing device 102, the hooks 902 may be inserted into the toe-in 904 openings and either (1) the other end of the cover 602 may be inserted into the cinch 906 opening or (2) closing the latch 1004 may secure the other end of the cover 602. To detach the cover 602 from the computing device 102, either (1) the other end of the cover 602 may be removed the cinch 906 opening or (2) the latch 1004 may be opened. The hooks 902 may then be removed from the toe-in 904 openings of the computing device 102.

In the flow diagram of FIG. 12, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the process 1200 is described with reference to FIG. 6, 7, 8, 9, 10, or 11 as described above, although other models, frameworks, systems and environments may be used to implement these processes.

FIG. 12 is a flowchart of a process 1200 that includes attaching and detaching a cover according to some embodiments. The process 1200 may be performed when attaching a cover to a computing device or detaching the cover from the computing device.

At 1202, multiple cam locks that are embedded into a computing device may be placed in an open position. At 1204, pins in a cover may be aligned with corresponding cam locks in the computing device. At 1206, the pins may be inserted into the corresponding cam locks. At 1208, the cam locks may be moved from the open position to a closed position (e.g., thereby attaching the cover to the computing device). For example, in FIG. 6, to attach the cover 602, the user may place the cam locks 606 in an open position, align the cover 602 with the computing device 102 such that the pins 604 are aligned with openings in the cam locks 606, and place the cam locks 606 in a closed position. In the closed position, the cam locks 606 may be positioned such that a top surface of the cam locks 606 is flush with an outer surface of the computing device 102. The cover 602 may include the curve 608 that causes the cover 602 to apply pressure to an outer surface of the computing device 102 when the cover 602 is attached to the computing device 102.

At 1210, the cam locks may be moved from the closed position to the open position. At 1212, the cover may be detached from the computing device (e.g., thereby causing the pins to be removed from the corresponding cam locks). For example, in FIG. 6, to detach the cover 602, the user may place the cam locks 606 in the open position, causing the pins 604 to be separated from the cam locks 606, and enabling the user to remove the cover 602. After the cam locks 606 have been placed in the open position, the curve 608 in the cover 602 may result in the pressure of the preload causing the pins 604 to automatically pop out of one or more of the cam locks 606. In some cases, the slider 808 mechanism illustrated in FIG. 8 may be used to move the cam locks 606 from the open 802 position to the closed 806 position or from the closed position 806 position to the open 802 position. For example, moving the slider 808 in a first direction (e.g., to the right) may cause the cam locks 606 to draw the pins 604 into the openings 704 and temporarily lock the pins 604 in place to attach the cover 602 to the computing device 102. Moving the slider 808 in a second direction (e.g., to the left) may cause the cam locks 606 to enable the pins 604 to exit the openings 704 and enable the user to detach the cover 602 from the computing device 102.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
    placing individual cam locks of a plurality of cam locks embedded into a computing device to an open position, wherein the computing device comprises:
    a first housing comprising:
       a first display device; and
       a first set of the plurality of cam locks;
    a second housing comprising:
       a second display device; and
       a second set of the plurality of cam locks;
    one or more hinges attaching the first housing to the second housing, wherein the one or more hinges enable the first housing to positioned at an angle relative to the second housing;
    aligning individual pins of a plurality of pins fastened to a cover with the individual cam locks of the plurality of cam locks;
    inserting the individual pins of the plurality of pins into the individual cam locks of the plurality of cam locks; and
    moving the individual cam locks of the plurality of cam locks from the open position to a closed position, thereby causing the cover to be attached to an external surface of the computing device, wherein the cover includes a curved portion that causes the cover to apply pressure to the external surface of the computing device after the plurality of cam locks are placed in the closed position.

2. The method of claim 1, wherein the computing device further comprises:
    one or more sliders, wherein:
       each slider engages one or more cam locks of the plurality of cam locks;
       sliding the one or more sliders in a first direction causes the one or more cam locks to be placed in the open position; and
       sliding the one or more sliders in a second direction that is opposite from the first direction causes the one or more cam locks to be placed in the closed position.

3. The method of claim 1, wherein the cover comprises one or more layers, wherein each layer of the one or more layers comprises one of a metal layer, a plastic layer, or a cloth layer.

4. The method of claim 1, wherein each pin of the plurality of pins comprises at least one of:
    a pin head;
    a shaft; or
    a pin body.

5. The method of claim 1, wherein each cam lock of the plurality of cam locks comprises:
    a tool engagement notch; and
    an opening into which a pin of the plurality of pins may be inserted.

6. The method of claim 1, wherein moving the individual cam locks of the plurality of cam locks from the open position to a closed position causes the individual cam locks to draw the individual pins further into an opening in each of the individual cam locks, such that the cover is substantially flush with an outer surface of the computing device.

7. A computing device comprising:
    a first housing comprising:
       a first display device;
       a first set of cam locks;
    a second housing comprising:
       a second display device;
       a second set of cam locks;
    a hinge coupling the first housing to the second housing, wherein the hinge enables the first housing to be placed at an angle relative to the second housing; and
    a cover comprising:
       a first set of pins coupled to the first set of cam locks in a closed position; and
       a second set of pins coupled to the second set of cam locks in the closed position;
       wherein the cover includes a curved portion that causes the cover to apply pressure to an outer surface of the computing device when the cover is attached to the computing device.

8. The computing device of claim 7, wherein the cover is detached from the computing device by:
    placing the first set of cam locks in an open position; and
    placing the second set of cam locks in the open position.

9. The computing device of claim 8, wherein placing the first and second set of cam locks in the open position causes at least one pin of the first set of pins or the second set of pins to be extracted from a corresponding cam lock due to the pressure exerted by the cover to the outer surface of the computing device.

10. The computing device of claim 7, wherein the computing device further comprises:
    a first set of sliders in the first housing to engage the first set of cam locks; and
    a second set of sliders in the second housing to engage the second set of cam locks.

11. The computing device of claim 10, wherein:
    sliding the first set of sliders in a first direction causes the first set of cam locks to be placed in an open position; and sliding the second set of sliders in the first direction causes the second set of cam locks to be placed in the open position.

12. The computing device of claim 11, wherein:
sliding the first set of sliders in a second direction that is opposite from the first direction causes the first set of cam locks to be placed in the closed position; and
sliding the second set of sliders in the second direction causes the second set of cam locks to be placed in the closed position.

13. The computing device of claim 12, wherein moving individual cam locks of the first or second set of cam locks from the open position to the closed position causes the individual cam locks to draw a corresponding pin further into an opening in the individual cam locks, such that an inner surface of the cover is substantially flush with the outer surface of the computing device.

14. The computing device of claim 7, wherein the cover comprises at least one of a metal layer, a plastic layer, or a cloth layer.

15. The computing device of claim 7, wherein individual pins of the first and second set of pins comprise at least one of:
a pin head;
a shaft; or
a pin body.

16. The computing device of claim 7, wherein individual cam locks of the first set of cam locks and the second set of cam locks comprises:
a tool engagement notch; and
an opening into which an individual pin of the first set of pins or the second set of pins may be inserted.

17. A computing device comprising:
a first housing comprising:
a first display device;
a first set of cam locks placed in a closed position;
a second housing comprising:
a second display device;
a second set of cam locks placed in the closed position;
a hinge coupling the first housing to the second housing to enable the first housing to be placed at an angle relative to the second housing; and
a cover comprising:
a first set of pins coupled to the first set of cam locks; and
a second set of pins coupled to the second set of cam locks;
a curved portion of the cover to apply pressure to an exterior surface of the computing device after the cover is attached to the computing device.

18. The computing device of claim 17, wherein the cover is detached from the computing device by:
placing the first set of cam locks in an open position; and
placing the second set of cam locks in the open position;
wherein the pressure exerted by the cover to the exterior surface of the computing device causes at least one pin of the first set of pins or the second set of pins to be extracted from a corresponding cam lock.

19. The computing device of claim 17, wherein the cover comprises at least one of a metal layer, a plastic layer, or a cloth layer.

20. The computing device of claim 17, wherein moving individual cam locks of the first or second set of cam locks from an open position to the closed position causes the individual cam locks to draw a corresponding pin of the first and second set of pins further into an opening in the individual cam locks, causing an inner surface of the cover to be substantially flush with an outer surface of the computing device.

* * * * *